United States Patent
Wang et al.

(10) Patent No.: US 11,575,466 B2
(45) Date of Patent: Feb. 7, 2023

(54) ERROR RECONCILIATION METHOD FOR LWE PUBLIC KEY CRYPTOGRAPHY

(71) Applicant: TSINGHUA UNIVERSITY, Beijing (CN)

(72) Inventors: Xiaoyun Wang, Beijing (CN); Anyu Wang, Beijing (CN); Yue Sun, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 0 days.

(21) Appl. No.: 17/361,074

(22) Filed: Jun. 28, 2021

(65) Prior Publication Data

US 2021/0328714 A1    Oct. 21, 2021

Related U.S. Application Data

(63) Continuation of application No. PCT/CN2019/102934, filed on Aug. 28, 2019.

(30) Foreign Application Priority Data

Feb. 26, 2019    (CN) .......................... 201910140289.X

(51) Int. Cl.
*H04L 1/00*    (2006.01)
*H04L 9/08*    (2006.01)

(52) U.S. Cl.
CPC .......... *H04L 1/0047* (2013.01); *H04L 1/0041* (2013.01); *H04L 1/0061* (2013.01); *H04L 9/0825* (2013.01); *H04L 9/0894* (2013.01)

(58) Field of Classification Search
CPC ... H04L 1/0041; H04L 1/0047; H04L 1/0061; H04L 9/0825; H04L 1/0042; H04L 9/304
See application file for complete search history.

(56) References Cited

U.S. PATENT DOCUMENTS

2004/0258177 A1* 12/2004 Shen .................... H04L 27/2053
375/308

OTHER PUBLICATIONS

Lee et al., Modification of Frodokem using Gray and Error correcting codes, IEEE Access, vol. 7, pp. 179564 to 179574 (Dec. 12, 2019).*

(Continued)

*Primary Examiner* — Shelly A Chase

(57) ABSTRACT

The invention discloses an error reconciliation method for a Learning With Errors (LWE) public key cryptography. The method includes an encoding algorithm and a decoding algorithm. The input of the encoding algorithm is a binary message vector $u \in \{0,1\}^k$ with a length of k, the output is a q-ary vector $z \in Z_q^m$ with a length of m, where $Z_q = \{-q/2, \ldots, q/2-1\}$; the input of the decoding algorithm is a q-ary vector $w=z+e \in Z_q^m$ containing errors with a length of m, and the output is a binary vector $u \in \{0,1\}^k$ corresponding to z; the error reconciliation method for the LWE public key cryptography provided by the present invention combines a binary linear code with a Gray code to realize the error reconciliation scheme in LWE public key cryptography. The error reconciliation method can be used to solve the problem of error reconciliation in LWE public key cryptography. The scheme of the invention has good fault tolerance and can significantly improve the transmission rate of encrypted information.

4 Claims, 3 Drawing Sheets

(56) References Cited

OTHER PUBLICATIONS

Clercq et al., Efficient software implementation of Ring-LWE encryption, IEEE, pp. 339 to 344. (Year: 2015).*
Lee et al., Modification of Frodokem using Gray and error correcting codes, IEEE Access, pp. 179564—179574 (Year: 2019).*

* cited by examiner

ERROR RECONCILIATION METHOD FOR LWE PUBLIC KEY CRYPTOGRAPHY

This application claims the priority of a Chinese patent application filed on Chinese Patent Office on Feb. 26, 2019, with an application number 201910140289.X, and an invention name "An Error Reconciliation Method for LWE Public Key Cryptography", its entire content is incorporated here by reference in this application.

TECHNICAL FIELD

The invention relates to the technical field of cryptography, in particular to an error reconciliation method for LWE public key cryptography.

BACKGROUND

In recent years, with the development of quantum computing theory, the security of existing public key cryptosystems under quantum computing models has been greatly challenged. For example, the currently widely used RSA public-key cryptosystem or elliptic curve public-key cryptosystem, which depends on the difficult mathematical problem-large integer decomposition or discrete logarithm problem on elliptic curve groups, both having polynomial time efficient solution algorithms under quantum computing models. This prompted researchers to start designing cryptography that can resist quantum computer attacks, which is "post-quantum cryptography." At present, the research of post-quantum cryptography has become an extremely important and active emerging cryptographic direction. Many developed countries have put great efforts on the research of post-quantum cryptography and established various major research support programs. The US National Security Agency (NSA) has announced a migration plan for quantum-resistant cryptographic algorithms in August 2015. In the same year, the National Institute of Standards and Technology (NIST) opened the collection and evaluation of post-quantum cryptographic algorithms. According to the different underlying difficult mathematical problems, post-quantum cryptography can be mainly divided into: code-based cryptography, lattice-based cryptography, hash-based cryptography, and multi-variable-based cryptography. LWE public key cryptography is an important class of lattice-based post-quantum public key cryptography.

A key to designing public key cryptographic algorithms based on LWE problems is the problem of error reconciliation. For example, Alice encrypts a message u to a ciphertext v through the LWE public key encryption scheme and sends v to a receiver Bob. When decrypting the ciphertext v, Bob can only get $w=u+e$ by calculation, where e is a Gaussian error. The problem of error coordination is the problem of getting the message u by eliminating the error e from the vector $w=u+e$. On the one hand, the errors introduced in the solution are necessary for security. Errors play a key role in the difficulty of the LWE problem under the quantum computing model. Without errors, this solution can be easily cracked by attackers. On the other hand, legitimate receiver Bob needs to be able to effectively eliminate the error, otherwise the existence of the error will cause the receiver to only get an approximate value of the information, which will cause the communication to fail. The existing error reconciliation scheme is to directly disperse each bit information of the message into an integer interval $\{-q/2, \ldots, q/2-1\}$, and then transmit the dispersed information. For example, in the current Peikert error reconciliation scheme, Alice first maps each bit of the message u according to the rules $0 \to 0$; $1 \to -q/2$, obtains the vector u', and then encrypts and transmits it to Bob. Bob calculates $w=u'+e$ during decryption, and then uses the rule $\{-q/4, \ldots, q/4-1\} \to 0$ and $\{-q/2, \ldots, -q/4-1\} \cup \{q/4, \ldots, q/2-1\} \to 1$ to the vector w and get the message u.

In the existing error reconciliation schemes, the key to the successful decoding of the message receiver is that the error e cannot exceed a predetermined range. For example, in Peikert's error coordination scheme, each bit of error e is required to be in the integer interval $\{-q/4, \ldots, q/4-1\}$, otherwise it cannot be decoded successfully. In the design of the LWE public key cryptographic algorithm, the error e is a vector that satisfies the Gaussian distribution, and its range must be determined in advance according to the security level of the algorithm. Therefore, when designing an error coordination scheme, in order to ensure successful decryption, one method is to select a larger q, which will lead to a larger ciphertext. Another method is to reduce the number of plaintext bits for each transmission. Both methods will result a loss of transmission rate.

SUMMARY

In view of the shortcomings in the prior art described above, the present invention provides a method for error reconciliation of LWE public key cryptography. By combining a binary linear code and a Gray code, an error reconciliation scheme for LWE public key cryptography is realized.

The error reconciliation method for LWE public key cryptography includes an encoding algorithm and a decoding algorithm; wherein the input of the encoding algorithm is a binary message vector $u \in \{0,1\}^k$ with length k and the output is a q-ary vector $z \in Z_q^m$ with a length m, where $Z_q = (-q/2, \ldots, q/2-1)$; the input of the decoding algorithm is a q-ary vector $w=z+e \in Z_q^m$ with a length m, and the output of the decoding algorithm is a binary vector $u \in \{0,1\}_k$ corresponding to z;

The encoding algorithm includes the following steps:

Step 1. By using a [n, k, d] binary linear encoder, mapping a binary vector u to a binary vector $x \in \{0,1\}^k$ with a length of n;

Step 2: By using a t-bit Gray code, mapping each t bits of a binary vector x to an integer in $Z_p$, so as to obtain a p-ary vector $y \in Z_p^m$ with a length of m, here the parameters need to satisfy a relation: $n=t \times m$, $p=2^t$, q is divisible by p;

Step 3: Multiplying each bit of the vector y by q/p to obtain a q-ary vector $z \in Z_q^m$ with a length of m;

The decoding algorithm includes the following steps:

Step 1: Dividing each bit of the vector w by q/p, and then rounding it according to a preset rounding method to obtain a p-ary vector $y' \in Z_p^m$ with a length of m;

Step 2: Using a t-bit Gray code to split each bit of the vector $y' \in Z_p^m$ into t bits, so as to obtain a binary vector $x' \in \{0,1\}^n$ with a length of n;

Step 3: Using the [n, k, d] binary linear decoder, recovering the message vector u from the binary vector $x' \in \{0,1\}^n$.

Optionally, the preset rounding mode is a rounding up/off mode.

Further, the length k of the input message and the modulus q of the output message in the encoding algorithm are determined in advance by the security level of the LWE public key cryptographic algorithm; in addition, the range of the error vector e is also determined by the security level of the LWE public key cryptographic algorithm.

Further, The selection steps for parameter [n,k,d] binary linear code and t-bit Gray code, and parameter $p=2^t$ determined by [n, k, d] binary linear code and t-bit Gray code, m=n/t comprising:

Step 1. Taking any t-bit Gray code such that t>1 and q is divisible by $p=2^t$;

Step 2: Calculating the capacity of the corresponding binary channel according to step 1 and step 2 in the decoding algorithm and the range of the error vector e;

Step 3: Selecting the corresponding [n, k, d] binary linear code according to the binary channel capacity, so that the decoding error probability meets the security level requirements of the LWE public key cryptographic algorithm;

Step 4: Calculating the parameter m=n/t, and determining whether the corresponding cipher text size meets the communication efficiency requirements of the LWE public key cryptographic algorithm; if it does not meet, select a new t-bit Gray code and repeat the above steps.

The error reconciliation method for the LWE public key cryptography provided by the present invention realizes error reconciliation by combining a binary linear code and a Gray code. The error reconciliation method includes an encoding algorithm and a decoding algorithm, which can be used to solve the problem of error reconciliation in LWE public key cryptography. The scheme of the invention has good fault tolerance and can significantly increase the transmission rate of encrypted data.

DETAILED DESCRIPTION

In order to make the objectives, technical solutions, and advantages of the embodiments of the present invention clearer, the technical solutions in the embodiments of the present invention will be clearly and completely described with reference to the accompanying drawings in the embodiments of the present invention. Obviously, the described embodiments are part of the embodiments of the present invention, but not all of them. Based on the embodiments of the present invention, all other embodiments obtained by a person of ordinary skill in the art without creative efforts shall fall within the protection scope of the present invention.

Figure 1:
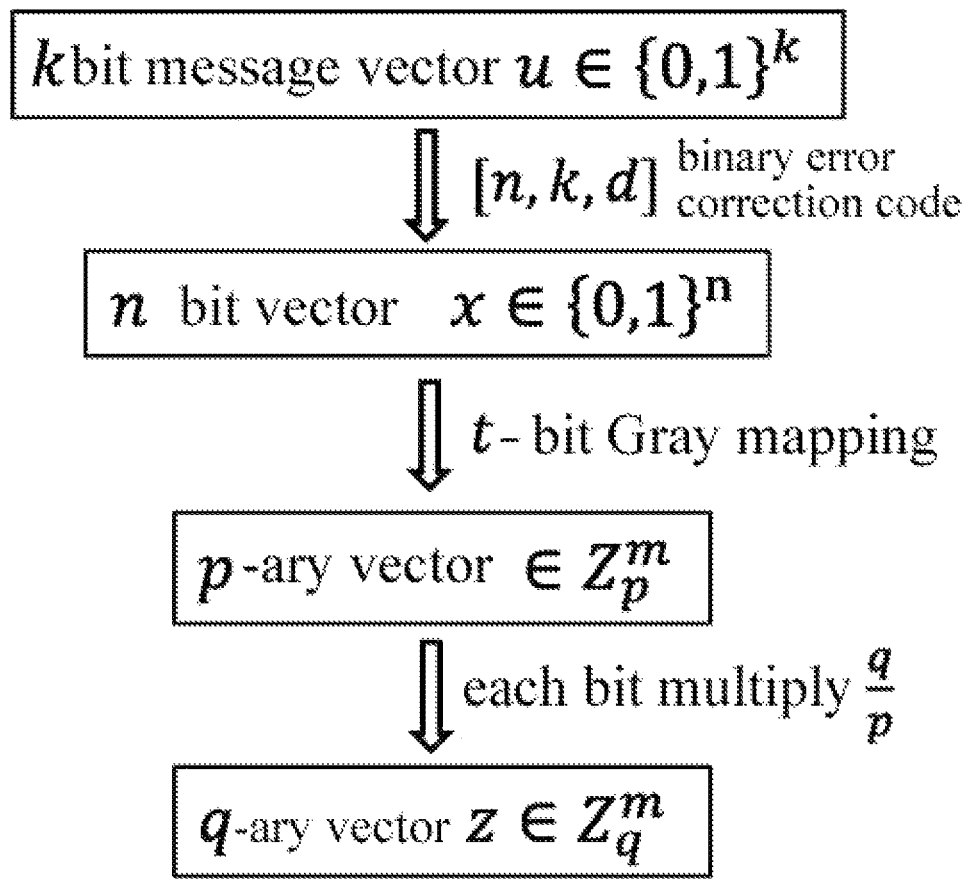
FIG. 1 is a flowchart of the encoding algorithm of the error reconciliation method for LWE public key cryptography according to an embodiment of the present invention.
Figure 2:
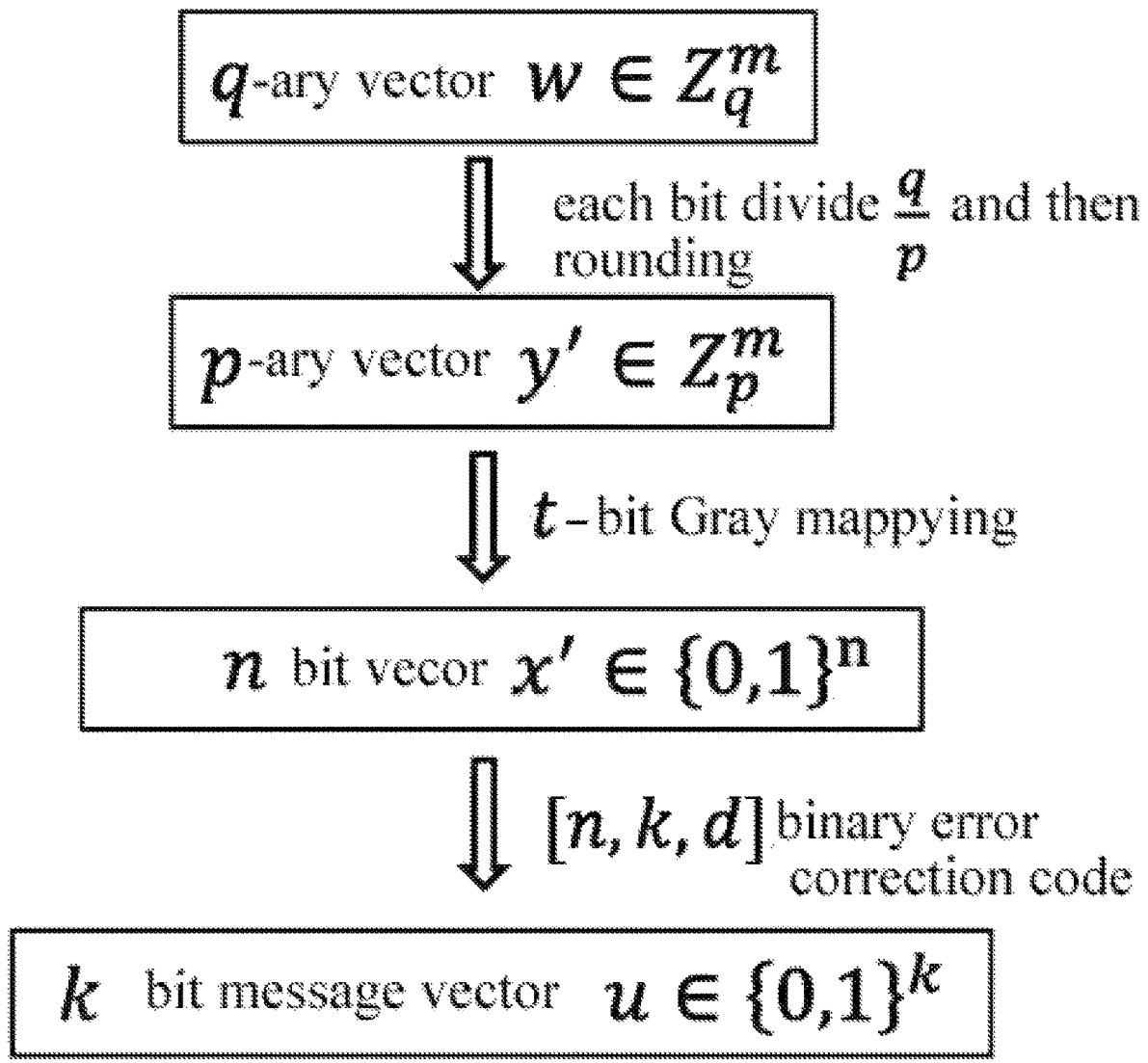
FIG. 2 is a flowchart of a decoding algorithm of the error reconciliation method for LWE public key cryptography according to an embodiment of the present invention.

Refer to FIG. 1 and FIG. 2. This embodiment provides an error reconciliation method for LWE public key cryptography, which includes an encoding algorithm (as shown in FIG. 1) and a decoding algorithm (as shown in FIG. 2). The input of the encoding algorithm is a binary message vector $u \in \{0,1\}^k$ with a length of k, and the output is a q-ary vector $z \in Z_q^m$ with a length of m, where $Z_q = \{-q/2, \ldots, q/2-1\}$. the input of the decoding algorithm is a q-ary vector w=z+ $e \in Z_q^m$ with a length m, and the output of the decoding algorithm is a binary vector $u \in \{0,1\}^k$ corresponding to z;

Encoding Algorithm:

Step 1. By using the encoder of a [n, k, d] binary linear code, mapping a binary vector u to a binary vector $x \in \{0,1\}_n$ with a length of n;

Step 2: By using a t-bit Gray code, mapping each t bits of a binary vector x to an integer on $Z_p$, so as to obtain a p-ary vector $y \in Z_p^m$ with a length of m, wherein parameters need to satisfy a relation: n=t×m, $p=2^t$, q is divisible by p;

Step 3: Multiplying each bit of the vector y by q/p to obtain a q-ary vector $z \in Z_q^m$ with a length of m;

Decoding Algorithm:

Step 1: Dividing each bit of the vector w by q/p, and then rounding it according to a preset rounding method to obtain a p-ary vector $y' \in Z_p^m$ with a length of m;

Step 2: Using a t-bit Gray code to split each bit of the vector $y' \in Z_p^m$ into t bits, so as to obtain a binary vector $x' \in \{0,1\}^n$ with a length of n;

Step 3: Using the [n, k, d] binary linear decoder, recovering the message vector u from the binary vector $x' \in \{0,1\}^n$.

Figure 3:
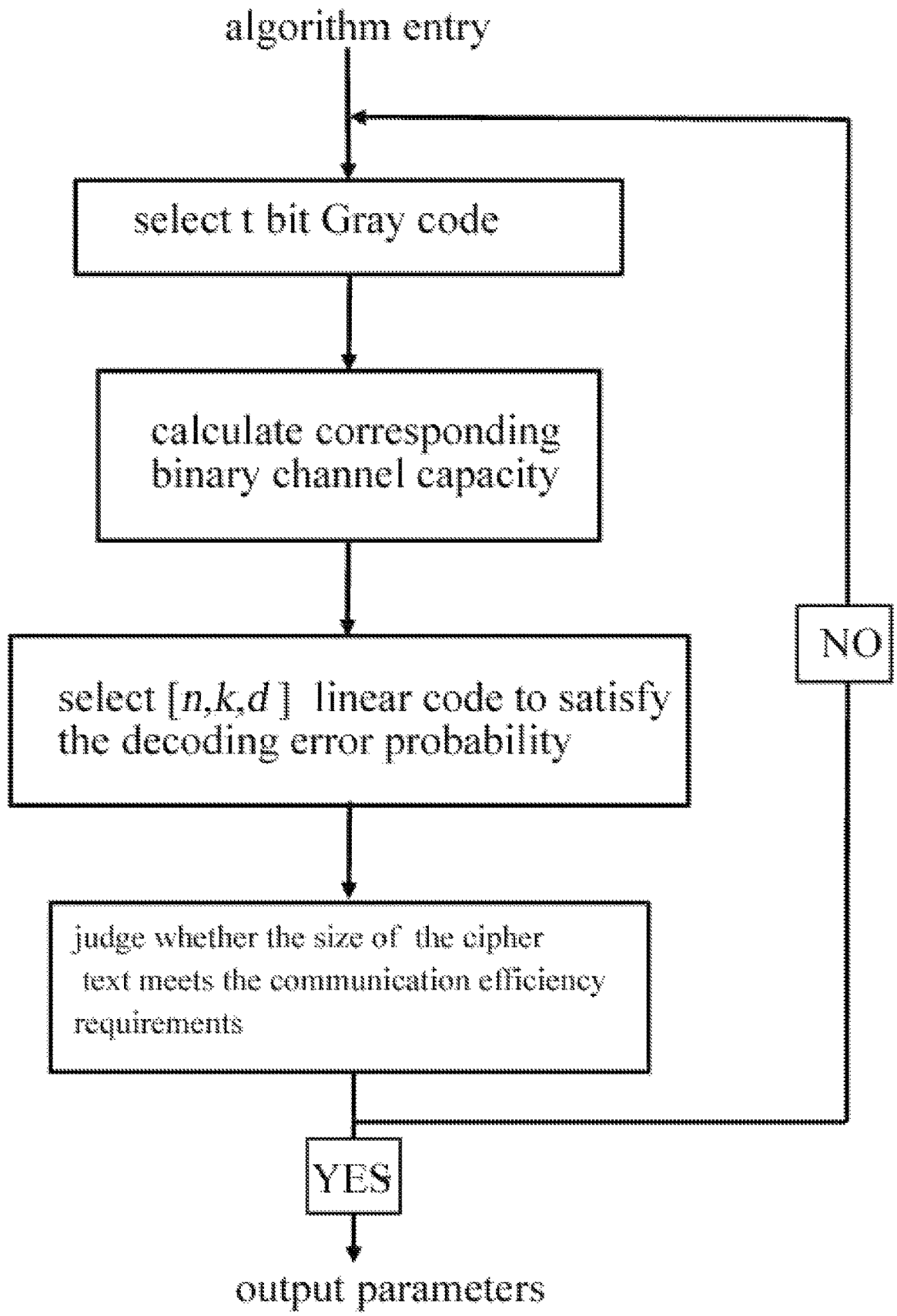
FIG. 3 is a flowchart of a parameter selection of the error reconciliation method for LWE public key cryptography provided by an embodiment of the present invention.

Parameter Selection:

The length k of the input message and the modulus q of the output message in the error coordination scheme have been determined in advance by the security level of the LWE public key cryptographic algorithm, and the range of the error vector e is also determined by the security level. Therefore, the parameters to be determined in the error coordination scheme include a [n, k, d] binary linear code and a t-bit Gray code, and $p=2^t$ and m=n/t determined by these parameters. The steps for parameter selection are shown in FIG. 3, which includes the following steps:

Step 1: Taking any t-bit Gray code such that t>1 and $p=2^t$ divide q evenly.

Step 2: Calculating the capacity of the corresponding binary channel according to steps 1 and 2 of the decoding algorithm and the range of the error vector e.

Step 3: Selecting the corresponding [n, k, d] binary linear code according to the capacity of the binary channel, so that the decoding error probability meets the security level requirements of the LWE public key cryptographic algorithm.

Step 4. Calculating the parameter m=n/t, and determining whether the corresponding cipher text size meets the communication efficiency requirements of the LWE public key cryptographic algorithm. If not, selecting a new t-bit Gray code and repeating the above steps.

It is worth mentioning that the combination of the binary linear code and Gray code used in the above solution of this embodiment can be replaced with a combination of q-ary linear code (or non-linear code) and q-ary Gray code. This alternative solution can also implement the LWE common. Its principle is the same as the principle of the above solution of this embodiment.

The error reconciliation method for the LWE public key cryptography provided in this embodiment implements an error reconciliation scheme in the LWE public key cryptography by combining a binary linear code and a Gray code. The error reconciliation method includes an encoding algorithm and a decoding algorithm, which can be used to solve the problem of error reconciliation in LWE public key cryptography. The scheme of the invention has good fault tolerance and can significantly increase the transmission rate of encrypted information.

In addition, it should be noted that, in the embodiments of the present invention, the terms "including" or any other variants thereof are intended to cover non-exclusive inclusion, so that a process, method, article, or terminal device including a series of elements is included. Include not only those elements, but also other elements not explicitly listed, or elements inherent to such a process, method, article, or terminal. Without more restrictions, the elements defined by the sentence "including a . . . " do not exclude the existence of other identical elements in the process, method, article, or terminal device including the elements.

The above are only preferred embodiments of the present invention and are not intended to limit the present invention. For those skilled in the art, the present invention may have various modifications and changes. Any modification, equivalent replacement, or improvement made within the spirit and principle of the present invention shall be included in the protection scope of the present invention.

What is claimed is:

1. A method for error reconciliation of LWE public key cryptography, characterized in that the error reconciliation method for LWE public key cryptography includes an encoding algorithm and a decoding algorithm; wherein the input of the encoding algorithm is a binary message vector $u \in \{0,1\}^k$ with length k and the output is a q-ary vector $z \in Z_q^m$ with a length m, where $Z_q = \{-q/2, \ldots, q/2-1\}$; the input of the decoding algorithm is a q-ary vector $w = z + e \in Z_q^m$ whth a length m, and the output of the decoding algorithm is a binary vector $u \in \{0,1\}^k$ corresponding to z;

the encoding algorithm executed by an encoder, comprising the following steps:

Step 1: By using a [n, k, d] binary linear encoder, mapping a binary vector u to a binary vector $x \in \{0,1\}^n$ with a length of n;

Step 2: By using a t-bit Gray code, mapping each t bits of a binary vector x to an integer on $Z_p$, so as to obtain a p-ary vector $y \in Z_p^m$ with a length of m, wherein parameters need to satisfy a relation: $n = t \times m$, $p = 2^t$, q is divisible by p;

Step 3: Multiplying each bit of the vector y by q/p to obtain a q-ary vector $z \in Z_q^m$ with a length of m;

The decoding algorithm executed by an decoder, comprising the following steps:

Step 1: Dividing each bit of the vector w by q/p, and then rounding it according to a preset rounding method to obtain a p-ary vector $y' \in Z_p^m$ with a length of m;

Step 2: Using a t-bit Gray code to split each bit of the vector $y' \in Z_p^m$ into t bits, so as to obtain a binary vector $x' \in \{0,1\}^n$ with a length of n;

Step 3: Using the decoder of the [n, k, d] binary linear code, recovering the message vector u from the binary vector $x' \in \{0,1\}^n$.

2. The method for error reconciliation of LWE public key password according to claim 1, characterized in that the preset rounding mode is a rounding up/off mode.

3. The method for error reconciliation of LWE public key cryptography according to claim 1, characterized in that the length k of the input message and the modulus q of the output message in the encoding algorithm are determined in advance by the security level of the LWE public key cryptographic algorithm; in addition, a range of the error vector e is also determined by the security level of the LWE public key cryptographic algorithm.

4. The method for error reconciliation of LWE public key cryptography according to claim 1, characterized in that the selection steps for parameter [n,k,d] binary linear code and t-bit Gray code, and parameter $p = 2^t$ determined by [n, k, d] binary linear code and t-bit Gray code, m=n/t comprising:

Step 1: taking any t-bit Gray code such that t>1 and q is divisible by $p = 2^t$ evenly;

Step 2: calculating the capacity of the corresponding binary channel according to step 1 and step 2 in the decoding algorithm and a range of the error vector e;

Step 3: selecting the corresponding [n, k, d] binary linear code according to the binary channel capacity, so that the decoding error probability meets the security level requirements of the LWE public key cryptographic algorithm;

Step 4: calculating the parameter m=n/t, and determining whether the corresponding cipher text size meets the communication efficiency requirements of the LWE public key cryptographic algorithm; if it does not meet, select a new t-bit Gray code and repeat the above steps.

* * * * *